United States Patent

Cawi

[11] 4,059,029
[45] Nov. 22, 1977

[54] TRANSMISSION FOR DRIVING A MOVABLE ELEMENT, PARTICULARLY A COMPONENT IN A MACHINE TOOL, AT HIGH SPEED OR CREEP SPEED

[76] Inventor: Ingo M. Cawi, Ritterstr. 15, 1 Berlin 45, Germany

[21] Appl. No.: 709,238

[22] Filed: July 27, 1976

Related U.S. Application Data

[63] Continuation of Ser. No. 485,078, July 2, 1974, abandoned.

[30] Foreign Application Priority Data

July 6, 1973 Germany ............................ 2335132

[51] Int. Cl.² .................. F16H 57/10; B23Q 17/00
[52] U.S. Cl. .................................. 74/785; 74/826
[58] Field of Search .................... 74/785, 640, 826

[56] References Cited

U.S. PATENT DOCUMENTS

| | | | |
|---|---|---|---|
| 1,193,916 | 8/1916 | Norris | 74/785 |
| 2,936,656 | 5/1960 | Conover | 74/826 |
| 3,005,358 | 10/1961 | Musser | 74/640 |
| 3,709,059 | 1/1973 | Elsel | 74/640 X |

*Primary Examiner*—Samuel Scott
*Assistant Examiner*—Lance W. Chandler
*Attorney, Agent, or Firm*—Witherspoon, Lane & Hargest

[57] ABSTRACT

The invention relates to a transmission for driving a movable element, particularly a component in a machine tool, at high speed or creep speed, in the form of a divided drive having one branch for the transmission of high speed and one branch for the transmission of creep speed and at least one member in one of the two branches being locked when creep speed is selected. The invention provides that for high speed and creep speed a pulse motor is provided and that for compensating the error in the actual position of the movable element from its required position an adjusting clutch is provided.

2 Claims, 2 Drawing Figures

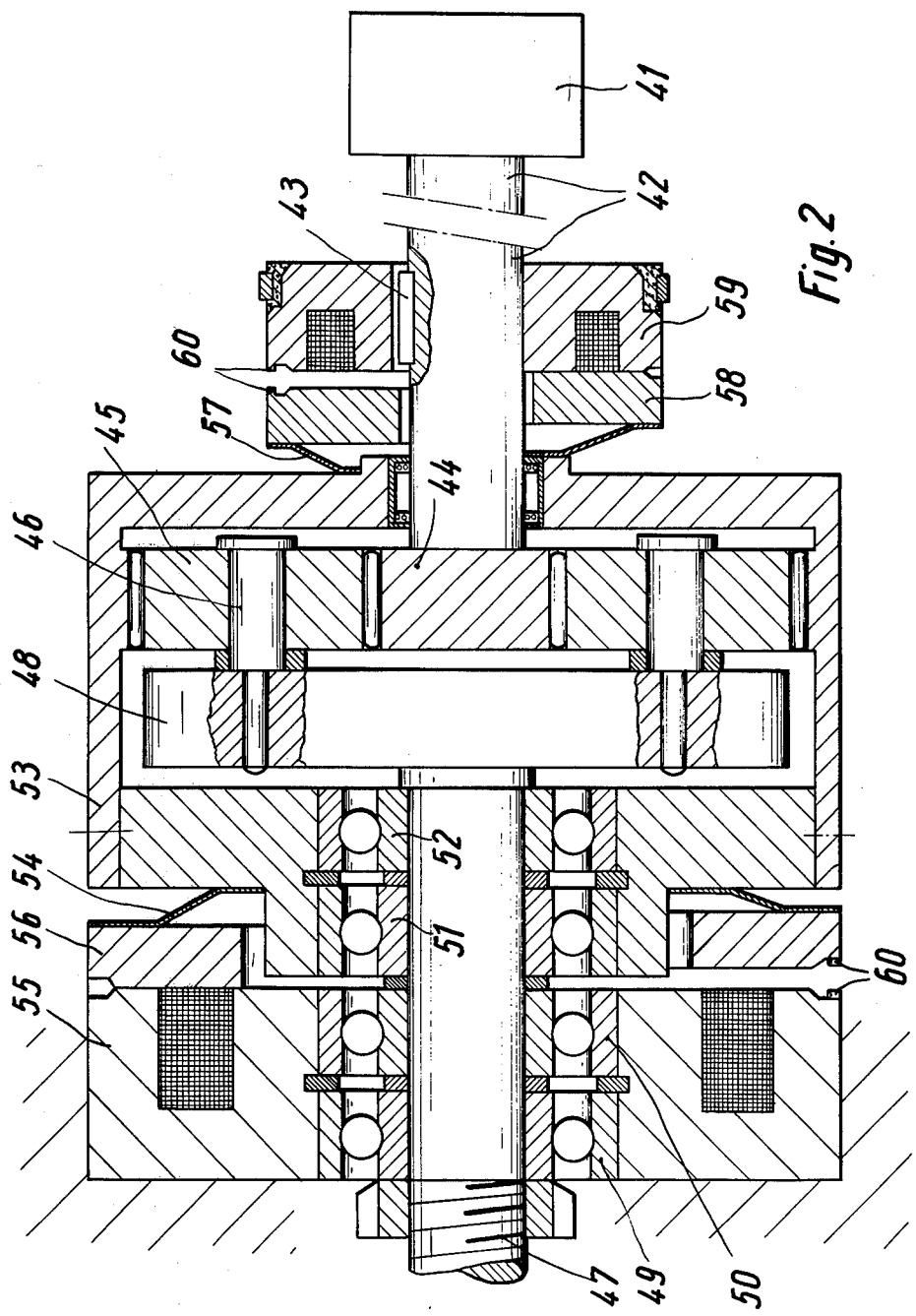

TRANSMISSION FOR DRIVING A MOVABLE ELEMENT, PARTICULARLY A COMPONENT IN A MACHINE TOOL, AT HIGH SPEED OR CREEP SPEED

This is a continuation, of application Ser. No. 485078 filed July 2, 1974 now abandoned.

The invention relates to an arrangement for driving a movable element, particularly a part in a machine tool, at high speed or creep speed, through a divided drive having one branch for the transmission of high speed and another branch for the transmission of creep speed, and at least one part in one of the two branches being locked when creep speed is selected.

Drives of the specified kind have been proposed in which the division of the drive is effected by epicyclic gearing. In such an arrangement different motors are associated with the branch drives for high speed and creep speed, the motor used for creep speed being a pulse motor and that for the high speed being an ordinary self-braking motor, the rough locating function of the latter being monitored by a synchro feedback.

For a variety of reasons conventional arrangements are not fully satisfactory. One reason is that the expenditure in means involved in the provision of two motors and monitoring feedback is excessive. Another reason is that the actual distance traversed by the movable element depends rather considerably upon the number of steps and the load against which the movable element works, since the holding torque of the motors is limited.

The object of the present invention is therefore the provision of a transmission of the above specified kind which is of simple and compact design and yet assures a a very high degree of positional accuracy.

According to the invention this object is achieved by the provision of one pulse motor for high speed and creep speed and of an adjusting clutch for compensating the error in the actual position of the movable element from its required position.

The proposed arrangement has the advantage that it permits a movable element to be digitally located by open loop control by the combination of at least one electric pulse motor with a mechanical locating means. In a preferred embodiment the divided drive may be an epicyclic drive comprising an internally geared part and at least one externally geared part meshing therewith, and in addition to the adjusting clutch means for the high speed drive there may be provided at least one braking means so that co-operation between the two means either prevents relative motion between the two parts for the high speed drive or permits such motion for the creep speed drive. An arrangement containing a gearing of such a kind can be particularly easily changed over from one speed to the other without any interruption in the flow of torque when changing from high speed to creep speed.

A particularly compact arrangement is one in which the externally geared part has the form of a cylindrical steel sleeve having a flexible wall deformable by a cam which is fast on the drive shaft of the pulse motor and projects into one end of the sleeve, thereby to generate relative motion between the steel sleeve and the internally geared part, the steel sleeve having an internal flange at the other end and its interior between said flange and the cam accommodating a clutch.

The invention will now be more particularly described with reference to the accompanying drawing in which:

FIG. 2 is a preferred second embodiment.

Figure 1:
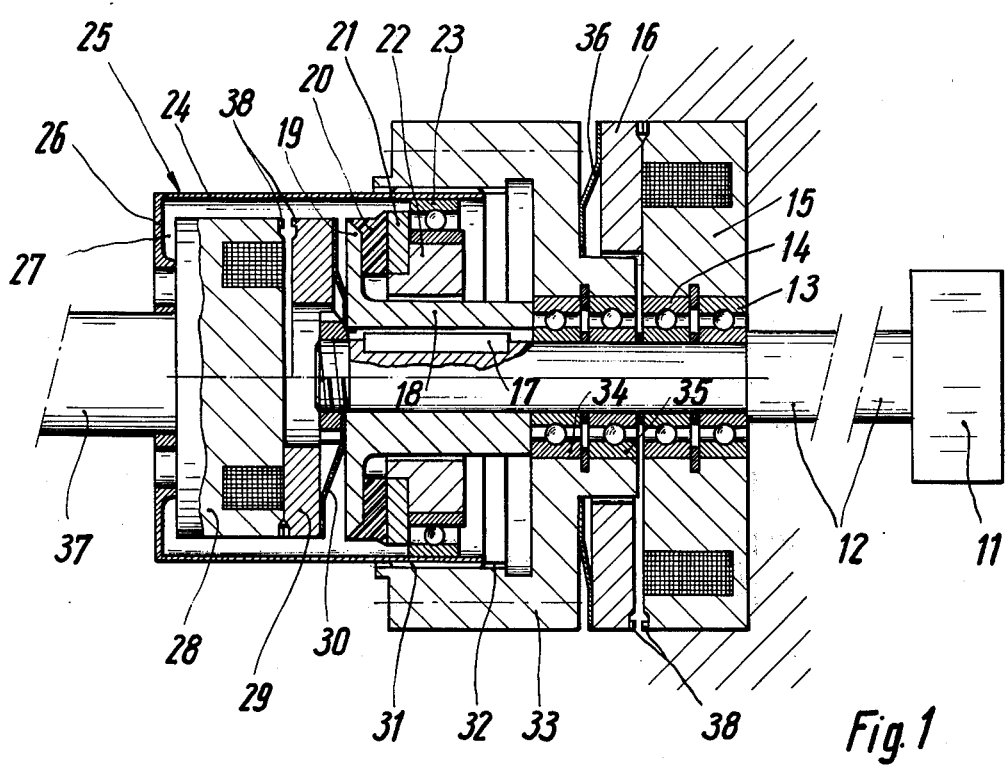
FIG. 1 is a first embodiment of a drive according to the invention.

Referring to FIG. 1, a pulse motor 11 drives a shaft 12 at a constant angular stepping speed. The shaft 12 is mounted in two ball bearings 13 and 14 in the fixed member 15 of a brake comprising said member 15 which is fixed in a casing and a magnetically controllable movable member 16. Secured to the end of the shaft 12 by a key 17 is a bush 18 which has a flange 19 connected to an elliptical cam 22 with the interposition of an elastic ring 20 and a disc 21. The cam is supported by a ball bearing 23 fitted into the internal wall 24 of a part 25 in the form of a steel sleeve formed at one end with an internal flange 26.

Located inside the space 27 between the bush 18, the cam 22 and the internal flange 26 is a clutch comprising two members 28 and 29. Clutch member 28 is rotatably fast inside sleeve 25, whereas member 29 is attached to the bush 18 and shaft 12 by a diaphragm spring 30. External gear teeth 31 mesh with internal gear teeth 32 in a second part 33. The number of teeth in the external ring differs from that in the internal ring. The difference between the numbers of teeth permits part 25 to roll inside part 33 when the cam 22 rotates inside part 25 and part 33 is locked. Ball bearings 34, 35 are interposed between part 33 and shaft 12. Part 33 is connected to member 16 of the clutch by a diaphragm spring 36. 37 is the drive shaft driving a movable element which is not shown in the drawing but which may be the rotary table of a machine.

The members 15 and 16 respectively 28 and 29 are provided on their co-operating faces with teeth 38 which permit the torque peaks arising during the stepping drive to be reliably controlled and which in the case of brake 15, 16 also perform an adjusting respectively correcting function. The number of gear teeth on the brake corresponds to the number of steps in one revolution of the pulse motor.

For high speed transmission, as illustratively shown in the bottom half of FIG. 1, the brake 15, 16 is disengaged and the torque is transmitted from the pulse motor 11 by shaft 12, diaphragm spring 30 and clutch 28, 29 directly to the driven shaft 37. At the end of the high speed step a tooth on brake member 16 should face a gap between two teeth on brake member 15. However, the reactive torque of the load which acts on the driven shaft 37 may cause the shaft 12 to deviate slightly from its desired position. This deviation is corrected by engagement of brake members 15 and 16, because the correcting moment of the adjusting brake 15, 16 substantially exceeds the holding moment of the pulse motor 11. The angular error which depends upon the load is thus corrected with considerable accuracy.

For the creep speed drive which is illustrated in the upper half of FIG. 1 the brake 15, 16 locks part 33, whereas clutch 28, 29 is disengaged. The torque flux in this case is transmitted from the pulse motor 11 by shaft 12, bush 18, flange 19, ring 20, disc 21 and cam 22 in ball bearing 23 to sleeve 25, clutch member 28 and thus to the drive shaft 37.

At the end of the creep speed step a correction of any existing angular error is possible by re-engaging clutch 28, 29. However, such a correction is always unnecessary because the actual angular errors in creep speed will be negligibly small. If the brake and clutch means are used which are in engagement in position of rest a pulse motor can be used which has no self-holding moment because the the brake and clutch means will then lock the transmission.

FIG. 1 clearly and strikingly illustrates that the arrangement of the several elements provides an extremely compact and clean design. Hysteresis phenomena are reduced to a minimum. The entire system is of low weight and permits considerable torques to be handled with the highest efficiency. The co-axial disposition of the drive shaft 12 and the driven shaft 37 offers considerable advantages for many possible different applications.

In FIG. 2 a pulse motor 41 drives a shaft 42. A pinion 44 is secured on the end of the shaft 42, the pinion 44 meshing with several wheels 45 having external gear teeth. These gear wheels 45 are mounted on shafts 46 fitted in a plate 48 which is fast on the driven shaft 47. The driven shaft 47 runs in two ball bearings 49 and 50. Two further ball bearings 51 and 52 support a part 53 which has internal gear teeth meshing with the external gear teeth of the gear wheels 45. A diaphragm spring 54 connects part 53 to a brake comprising two brake members 55 and 56. Moreover, another diaphragm spring 57 rotatably couples the part 53 to a clutch comprising two members 58 and 59. Clutch member 59 of clutch 58, 59 is fast on shaft 42, being located by a key 53. All the and brake members are provided on their facing sides with teeth 60 preferably in the form of a Hirth type serration capable of relatively adjusting the brake brake members.

In this embodiment the clutch 55, 56 likewise serves for correcting angular error of the drive shaft 42 from its required position caused by and proportional to the reactive torque.

The torque flux during high speed operation is shown in the bottom half of FIG. 2. It will be seen that for the high speed drive the clutch members 58 and 59 are in engagement. Part 53 is therefore rotated at the same angular speed and through the same angle as plate 48 and consequently as the driven shaft 47. The reactive torque which acts on the driven shaft causes the shaft 42 slightly to deviate from its correct position at the end of a high speed step. This angular error is corrected by engaging the adjusting, respectively correcting brake 55, 56 so that the teeth on brake member 56 are pulled into the spaces between neighbouring teeth on the brake member 55.

The drive for creep speed is illustrated in the upper half of FIG. 2. For the creep speed drive the clutch members 58 and 59 are disengaged and part 53 is kept stationary by the diaphragm spring 44 and the engaged brake 55, 56. The pinion 44 causes the part 45 represented by gear wheels to roll in the internal gear ring of part 53. This transmits a rotary motion to plate 48 which corresponds to the rotary motion of the driven shaft 47.

It is possible to provide several speeds instead of only one in a transmission according to the invention. The transmission ratio may be represented by $i_1/i_2 = a^n$ where $a$ is a number corresponding to the system of units used in the programme. In metric systems $a$ may be 10, in angular systems, 60. The exponent $n$ may be any natural number.

I claim:

1. A driving and positioning device for driving a movable element, particularly a component in a machine tool at high speed or creep speed through a specified cycle and for positioning it in required positions corresponding to the desired positions of a stepping motor forming part of the device said device comprising a stepping motor providing a single input, a drive shaft connected to said stepping motor, an epicylic drive connected to the drive shaft and comprising a driven shaft for driving the externally geared movable element, said epicylic drive having one branch for the transmission of high speed to the driven shaft and one branch for the transmission of creep speed to the driven shaft, the branch for the transmission of the high speed to the driven shaft comprising a clutch for connecting and disconnecting the drive shaft to an internally geared part of the epicylic drive and a brake to keep said internally geared part in a fixed position when it is disconnected from the drive shaft by the clutch during creep speed motions, the brake being disconnected from said internally geared part during high speed motions and upon completion of the high speed motion serving as an indexing means wherein the mating brake elements are engageable and disengageable thereby eliminating the deviation of the drive shaft from its desired position within the range between two steps of the stepping motor.

2. The invention as set forth in claim 1 and wherein the externally geared part is a cylindrical sleeve having a flexible wall which is deformable by a cam mounted on the drive shaft and projecting into the sleeve to generate relative motion between the sleeve and the internally geared part.

* * * * *